United States Patent [19]

Brow et al.

[11] Patent Number: 5,045,508

[45] Date of Patent: Sep. 3, 1991

[54] AMMONIA-TREATED PHOSPHATE GLASSES USEFUL FOR SEALING TO METALS METALS

[75] Inventors: Richard K. Brow, Albuquerque, N. Mex.; Delbert E. Day, Rolla, Mo.

[73] Assignee: The United States of America as represented by the United States Department of Energy, Washington, D.C.

[21] Appl. No.: 516,935

[22] Filed: Apr. 30, 1990

[51] Int. Cl.$^5$ .............................................. C03C 3/17
[52] U.S. Cl. ...................................... 501/48; 501/45; 105/30.1; 105/32.1
[58] Field of Search .................. 65/30.1, 32.1; 501/48, 501/45, 56

[56] References Cited

U.S. PATENT DOCUMENTS 4,202,700  5/1980  Wilder, Jr. ..................... 106/39.6
4,455,384  6/1984  Day et al. .......................... 501/15

OTHER PUBLICATIONS

Marchand, "Nitrogen-Containing Phosphate Glasses", *Journal of Non-Crystalline Solids;* vol. 56, 1983 pp. 173-178.

M. Rajaram et al., "Nitrogen Dissolution In Sodium Alkaline-Earth Metaphosphate Melts"; *Journal of the American Ceramic Society,* vol. 70, No. 4; Apr. 1987, pp. 203-207.

Reidmeyer et al., "Preparation of Phosphorus Oxynitride Glasses", *Journal of Non-Crystalline Solids,* vol. 85; 1986, pp. 186-203.

*Primary Examiner*—Mark L. Bell
*Assistant Examiner*—Deborah Jones
*Attorney, Agent, or Firm*—Armand McMillan; James H. Chafin; William R. Moser

[57] ABSTRACT

A method of improving surface-dependent properties of phosphate glass such as durability and wear resistance without significantly affecting its thermal expansion coefficient is provided which comprises annealing the glass in a dry ammonia atmosphere at temperatures approximating the transition temperature of the glass. The ammonia annealing treatment of the present invention is carried out for a time sufficient to allow incorporation of a thin layer of nitrogen into the surface of the phosphate glass, and the treatment improves the durability of the glass without the reduction in the thermal expansion coefficient that has restricted the effectiveness of prior ammonia treatments. The improved phosphate glass resulting from this method is superior in wear resistance, yet maintains suitable thermal expansion properties so that it may be used effectively in a variety of applications requiring hermetic glass-metal seals.

6 Claims, No Drawings

AMMONIA-TREATED PHOSPHATE GLASSES USEFUL FOR SEALING TO METALS METALS

The Government has rights in this invention pursuant to Contract No. DE-AC04-76DP00789 awarded by the U.S. Department of Energy to AT&T Technologies, Inc.

FIELD OF THE INVENTION

The invention relates in general to an ammonia-treated phosphate glass suitable for use as a glass-metal seal, and more particularly to a method of increasing the chemical durability of phosphate glasses by annealing at temperatures approximating the glass transition temperature in a dry ammonia atmosphere.

BACKGROUND OF THE INVENTION

Hermetic seals between glasses and high expansion metals, like aluminum and stainless steel, are required for a wide variety of applications in the industrial and opto-electronic arts. Such seals will be employed in a great number of components including connectors and pyrotechnic devices. In the past, phosphate glasses, such as those disclosed in U.S. Pat. No. 4,202,700 (Wilder, Jr.) have been considered for such applications because they possess the required thermal expansion characteristics to make matching stress-free seals with various high expansion metals. Unfortunately, such glasses have generally limited usefulness because of the unacceptably poor aqueous durabilities which result in low weathering resistance and other problems which restrict the useful lifetimes of such seals.

It is known in the art to improve chemical durability and wear resistance of phosphate glasses by incorporating nitrogen into the glass structure. An example of such a procedure is disclosed in U.S. Pat. No. 4,455,384 (Day et al). Additionally, it has been shown that significant durability-enhancing nitrogen contents can be incorporated by melting the glass at temperatures of several hundred degrees above the glass transition temperature in an ammonia atmosphere (see, e.g., Marchand, *J. Non-Cryst. Solids* 56:173 (1983)). In one such treatment, it was shown that the glass aqueous durability could be increased by up to about 1,000 times its original level (see Rajaram et al, *J. Am. Ceram. Soc.* 70:203 (1987)).

However, it is also the case that the incorporation of nitrogen into the bulk glass structure also reduces the initial thermal expansion coefficient of the glass. This reduction in expansion coefficient is extremely detrimental to the ability of the glass to withstand the stresses of thermal expansion, which is crucial for the glass to be used in applications which require a glass-metal seal. As a result, phosphate glass treated by such high-temperature ammonia processes can no longer be used to provide stress-free hermetic seals on high expansion metals. It is thus highly desirable to develop a way of improving the chemical durability of phosphate glasses without significantly reducing the thermal expansion coefficient so that the improved phosphate glass can still be used in stress-free glass-metal hermetic seals.

SUMMARY OF THE INVENTION

In accordance with the present invention, a method of improving the surface-dependent properties such as chemical durability and wear resistance of phosphate glass without significantly changing the bulk properties such as the thermal expansion coefficient is provided which comprises annealing the glass in a dry ammonia atmosphere at a temperature approximating the glass transition temperature. Annealing the glass in such a manner results in a thin nitrogen layer forming at the surface of the glass which improves the durability without affecting the thermal expansion coefficient. It is contemplated that the invention will be employed to improve the properties of phosphate glass which has been used in conventional hermetic glass to metal seals. The invention will thus allow use of high expansion, but previously poor durability phosphate glasses in many component applications.

DETAILED DESCRIPTION OF THE PREFERRED EMBODIMENTS

The method of the present invention is contemplated to be used with a number of phosphate glass systems, such as the primarily phosphate-sodium monoxide composition (known as "CON-2" glass) disclosed in U.S. Pat. No. 4,202,700, incorporated herein by reference. A typical phosphate glass which can be treated in the present invention will have a composition comprising about 10–60 mole percent of $Li_2O$, $Na_2O$ or $K_2O$; 5–40 mole percent of BaO or CaO; 0.1–10 mole percent of $Al_2O_3$; and 40–70 mole percent of $P_2O_5$. The composition may also contain up to about 30 mole percent of various known nucleating agents, wetting agents, or other modifiers.

In accordance with the present invention, the aqueous or chemical durability of phosphate glass can be improved significantly without affecting the bulk properties such as the thermal expansion coefficient during incorporating nitrogen into the glass surface by annealing the glass in dry ammonia gas at temperatures near the glass transition temperature ($T_g$). The phosphate glass is preferably heated in dry ammonia at or about $T_g$ for a time sufficient to allow incorporation of the nitrogen into the surface of the phosphate glass. This period of time will normally range from about 10 hours to about 50 hours. Most preferably, the treatment will be applied for about 25 to 35 hours. Annealing the phosphate glass in this manner at these temperatures is necessary to ensure that the nitrogen is incorporated only in the glass surface so that the bulk thermal expansion coefficient of the glass is not affected.

Treatments incorporating the method of the present invention have been carried out on phosphate glass at temperatures roughly within the range of about plus or minus 20° C. of the glass transition temperature for a period of about 30 hours. The precise temperature used in any particular application will thus be dependent on the precise nature and composition of the phosphate glass employed. Using the phosphate glass "CON-2" described above, temperatures of about 360°–400° C. (preferably about 380° C.) were found to be most suitable for the ammonia treatment in accordance with the invention.

Surface analyses of phosphate glass treated by the present method indicate that a nitrogen-rich surface layer of approximately 1–10 μm in thickness is formed as a result of the ammonia annealing step of the invention. The aqueous dissolution rate of the treated glass was observed to have decreased from about $2 \times 10^{-6}$ $g/cm^2$-min to $2 \times 10^{-7}$ $g/cm^2$-min, which is indicative of a significant improvement in chemical durability. Since the nitrogen was incorporated only in the glass surface, tests showed that the bulk thermal expansion coefficient was unaffected. Using the method of the present invention, therefore, the durability, wear resistance and other surface-dependent properties of the phosphate glass can be improved without a reduction in thermal expansion coefficient which would limit the usefulness of this glass in hermetic glass-metal seals. The method of the invention can be used on any suitable form of phosphate glass, including glass fibers.

It is particularly contemplated in the present invention that the low temperature ammonia treatment will be applied to improve the properties of phosphate glass used in hermetic seals with high expansion metals. The preferred method of operation would be that the hermetic seal is first made using conventional sealing techniques with high-expansion phosphate glasses, such as "CON-2", the glassy composition disclosed in U.S. Pat. No. 4,202,700. Following the conventional sealing technique, the glass-to-metal seals are then annealed at temperatures at or near the glass transition temperature in dry ammonia in accordance with the method of the present invention described above. The present method will improve the chemical durability of the glass without changing the stress distribution of the seal.

It has generally been observed that ammonia treatments within about 20° C. of $T_g$ for anywhere from about 10 to 50 hours will be sufficient to significantly improve glass durability in the above glass-metal hermetic seals without affecting the bulk thermal expansion coefficient of the glass. By employing the present method in these applications after the hermetic seal has been made, it is thus possible to use high-expansion but poor durability phosphate glasses in a number of component applications. The present invention allows for such phosphate glasses to retain their expansion capabilities while they acquire improved aqueous durabilities, and as a result these materials may be employed to provide matched, stress-free seals when used with high expansion metals.

The following examples are presented as illustrative of the present invention and are not intended to limit its scope in any way:

EXAMPLE 1

A sample of CON-2 phosphate glass prepared in accordance with the teachings of U.S. Pat. No. 4,202,700 was treated using the method of the present invention. The CON-2 glass had a composition of 27 mole percent $Na_2O$, 20 mole percent $BaO$, 3 mole percent $Al_2O_3$, and 50 mole percent $P_2O_5$. The glass was placed in a dry ammonia atmosphere tube furnace and treated at a temperature of 380° C. for a 30 hour period. When the annealing period was complete, the glass was analyzed using surface analysis techniques, and the aqueous dissolution rate of the glass was measured. Surface analyses revealed that a nitrogen-rich surface layer was formed which was about 1 μm in thickness. The aqueous dissolution rate of the CON-2 glass which had been measured at $2\times10^{-6}$ g/cm$^2$-min had decreased to $2\times10^{-7}$ g/cm$^2$-min after the 30 hour ammonia treatment of the present invention. Tests also showed that there was practically no reduction in the bulk glass thermal expansion coefficient following the ammonia treatment.

The low temperature ammonia treatment of the present invention was thus observed to improve the chemical durability of the phosphate glass without significantly affecting the thermal expansion coefficient. The improved glass is thus suitable for applications requiring hermetic seals between glasses and high expansion metals.

EXAMPLE 2

Using the apparatus as described in Example 1, a glass having a composition of 11.6 mole % $Na_2O$, 32.9 mole % $CaO$, 0.5 mole % $Al_2O_3$ and 50.5 mole % $P_2O_5$ was heated for 22 hours at 390° C. in a dry $NH_3$ atmosphere. The treated glass was tested in 37° C. deionized water with regard to its dissolution properties. The results of these tests indicated that the glass dissolution rate of the treated composition was improved by a factor of about 7, from $5.8\times10^{-4}$ g/cm$^2$-min to $8.6\times10^{-5}$ g/cm$^2$-min.

EXAMPLE 3

In the apparatus of Example 1, a composition of $50Li_2O\text{-}50P_2O_5$ (in mole %) was heated for 96 hours in dry $NH_3$ at 310° C. In tests of the treated material, the glass dissolution rate in 30° C. deionized water decreated from $5.7\times10^{-4}$ g/cm$^2$-min to $1.7\times10^{-4}$ g/cm$^2$-min, an improvement by a factor of about 4.

EXAMPLE 4

The method of the present invention can also be used to improve the durability of phosphate glass in the form of glass fibers. Using the apparatus of Example 1, CON-2 glass fibers (27 $Na_2O$-20$BaO$-3$Al_2O_3$-50$P_2O_5$ mole %) of about 30 μm in diameter are treated in dry $NH_3$ for 30 hours at 360° C. The fibers that are treated dissolve in 70° C. deionized water at a much slower rate than do untreated fibers. In tests in the deionized water, the sodium ion content of the water with treated fibers was only 9.4 ppm after 20 days, while the water with untreated fibers had a level of sodium of 34.2 ppm. After about 35 days of the test, untreated fibers are completely dissolved, while the treated fibers remain visibly unaffected.

What is claimed is:

1. A method of improving the surface-dependent properties of phosphate glass without significantly affecting the thermal expansion coefficient of the glass comprising the step of annealing the glass in a dry ammonia atmosphere at a temperature within 20° C. of the glass transition temperature so that a layer of nitrogen is incorporated into the surface of the glass.

2. A method according to claim 1 wherein the annealing is carried out for a period of about 10 to 50 hours.

3. A method according to claim 1 wherein the annealing is carried out for a period of about 25 to 35 hours.

4. A method according to claim 1 wherein the layer of nitrogen incorporated into the surface of the phosphate glass is about 1–10 μm in thickness.

5. A method according to claim 1 wherein the phosphate glass comprises about 10–60 mole percent of $Li_2O$, $Na_2O$ or $K_2O$; 5–40 mole percent of $BaO$ or $CaO$; 0.1–10 mole percent of $Al_2O_3$; and 40–70 mole percent of $P_2O_5$.

6. A method according to claim 5 wherein the phosphate glass is annealed at a temperature of about 360°–400° C.

* * * * *